United States Patent [19]
Ito

[11] Patent Number: 5,793,208
[45] Date of Patent: Aug. 11, 1998

[54] EXCITED MAGNETIC SENSOR WITH LATCH

[75] Inventor: Akio Ito, Saitama, Japan

[73] Assignee: Jeco Co., Ltd., Saitama, Japan

[21] Appl. No.: 732,766

[22] Filed: Oct. 21, 1996

[30] Foreign Application Priority Data

Oct. 20, 1995 [JP] Japan ................... 7-272381

[51] Int. Cl.$^6$ ................ G01R 33/04; G01P 3/42; G01P 3/487; G01P 3/489
[52] U.S. Cl. .......... 324/253; 324/174; 324/207.25; 324/255
[58] Field of Search ............... 324/225, 244, 324/247, 249, 253, 254, 255, 258, 260, 207.12, 207.15–207.18, 207.25, 173, 174; 33/356, 361; 340/870.32, 870.33

[56] References Cited

U.S. PATENT DOCUMENTS

| | | | |
|---|---|---|---|
| 3,568,052 | 3/1971 | Anderson | 324/253 |
| 4,290,018 | 9/1981 | Rhodes | 324/255 |
| 4,303,886 | 12/1981 | Rhodes | 324/255 |
| 4,480,226 | 10/1984 | Kuno et al. | 324/247 |
| 4,748,408 | 5/1988 | Itakura | 324/255 |

FOREIGN PATENT DOCUMENTS 61-83909  4/1986  Japan.

*Primary Examiner*—Gerard R. Strecker
*Attorney, Agent, or Firm*—Townsend and Townsend and Crew LLP; Kenneth R. Allen

[57] ABSTRACT

A magnetic sensor includes a magnetic core, an excitation coil, an oscillator and an excitation circuit, a detection coil, and a latch circuit. The excitation coil is wound on the magnetic core. The oscillator and the excitation circuit repeatedly supply a rectangular wave excitation current having a given polarity to the excitation coil. The detection coil is wound on the magnetic core on which the excitation coil has been wound. The detection coil generates an output signal having peaks of opposite polarities corresponding to magnitudes of a target measurement magnetic field in response to leading and trailing edges of the rectangular wave excitation current. The latch circuit receives an output signal having a predetermined polarity and generated by the detection coil, monitors a supply state of the excitation current obtained when a peak of the output signal having the predetermined polarity exceeds a predetermined threshold, and holds and outputs a signal corresponding to the supply state of the excitation current.

15 Claims, 4 Drawing Sheets

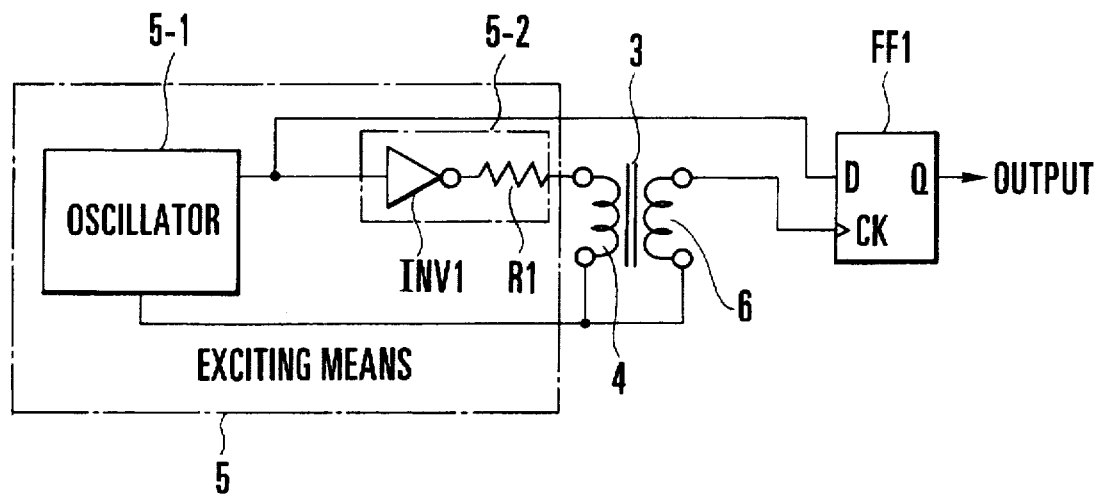
F I G. 4
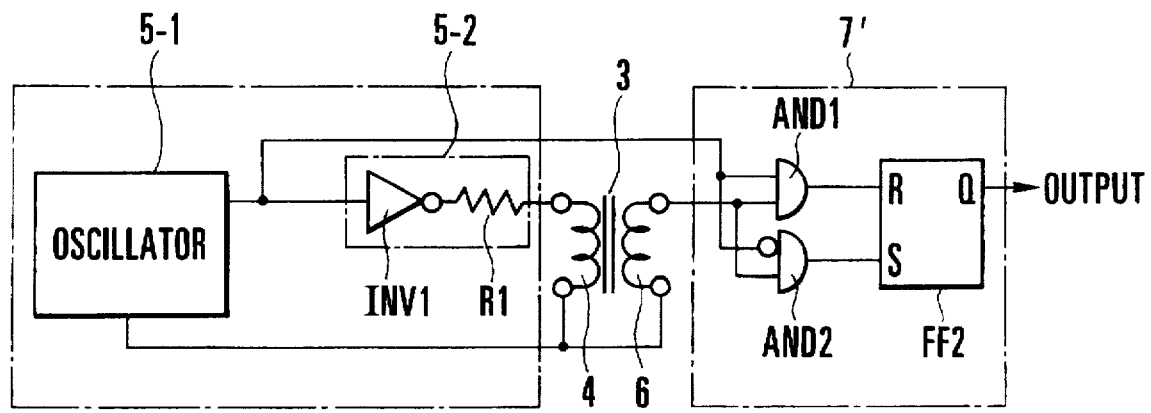
F I G. 5

EXCITED MAGNETIC SENSOR WITH LATCH

BACKGROUND OF THE INVENTION

The present invention relates to a magnetic sensor having a flux gate structure suitable for use to detect rotational and linear motions.

Various conventional magnetic sensors for detecting rotation speeds have been proposed, and a magnetic sensor shown in FIG. 8 is one of them. Referring to FIG. 8, reference numeral 1 denotes a disk-like rotary magnet mounted on a rotary body or rotating shaft (not shown); and 2, a Hall element IC. The Hall element IC 2 comprises a Hall element 2-1, an amplifier 2-2, a Schmitt circuit 2-3, and an output transistor 2-4. In the magnetic sensor having this arrangement, a change in magnetic field upon rotation of the rotary magnet 1 is detected by the Hall element 2-1, and the change in magnetic field detected by the Hall element 2-1 is amplified by the amplifier 2-2. The amplified signal is compared with a predetermined threshold in the Schmitt circuit 2-3, and the output transistor 2-4 is turned on or off in accordance with a comparison output from the Schmitt circuit 2-3. A pulse signal having the number of pulses corresponding to the rotation speed of the rotary magnet 1 can be obtained through the output transistor 2-4.

According to this conventional magnetic sensor, however, the Hall element 2-1 generally has a low sensitivity to the magnetic field and detects only a magnetic density at a level of several tens to several hundreds of Gauss. For this reason, a strong magnet must be used as the rotary magnet 1, resulting in a high cost. When the rotary magnet 1 has to be located at a position sufficiently away from the Hall element IC 2, detection from the remote position cannot be performed because the Hall element 2-1 has a low sensitivity to the magnetic field. The Hall element IC 2 has a large change in sensitivity to temperatures and a low heat resistance, and cannot be used in a place where a large temperature change occurs or in a high-temperature environment.

SUMMARY OF THE INVENTION

The present invention has been made to solve the conventional problem described above, and has as its object to provide a highly heat-resistant magnetic sensor capable of increasing a sensitivity to a magnetic field and decreasing a change in sensitivity to temperatures.

In order to achieve the above object of the present invention, there is provided a magnetic sensor comprising a magnetic core, an excitation coil wound on the magnetic core, exciting means for repeatedly supplying a rectangular wave excitation current having a given polarity to the excitation coil, a detection coil wound on the magnetic core on which the excitation coil has been wound, the detection coil being adapted to generate an output signal having peaks of opposite polarities corresponding to magnitudes of a target measurement magnetic field in response to leading and trailing edges of the rectangular wave excitation current, and latch means for receiving an output signal having a predetermined polarity and generated by the detection coil, monitoring a supply state of the excitation current obtained when a peak of the output signal having the predetermined polarity exceeds a predetermined threshold, and holding and outputting a signal corresponding to the supply state of the excitation current.

According to the present invention, for example, an output signal having a positive polarity is generated by a detection coil and is received by a latch means. The latch means monitors the supply state of the excitation current when the peak of the output signal exceeds a predetermined threshold. A signal (an "H"-level signal when the excitation current is kept supplied, and an "L"-level signal when the excitation current is cut off) corresponding to the supply state of the excitation current is held and output. A latch means according to the present invention is, for example, a latch circuit 7 shown in FIG. 1.

According to another aspect of the present invention, a magnetic core, an excitation coil, an exciting means, and a detection coil are arranged to obtain a magnetic sensor having a flux gate structure. The latch means receives an output signal having a predetermined polarity from the detection coil. Every time the peak of this output signal exceeds a predetermined threshold, a signal corresponding to the supply state of the excitation current is held and output.

According to the present invention, for example, a positive output signal generated by a detection coil is received. A signal (an "H"-level signal when the excitation current is supplied, and an "L"-level signal when the excitation current is cut off) corresponding to the supply state of the excitation current is held and output every time the peak of this output signal exceeds a predetermined threshold. A latch means according to the present invention is, for example, a D flip-flop FF1 shown in FIG. 4.

According to still another aspect of the present invention, a magnetic core, an excitation coil, an exciting means, and a detection coil are arranged to obtain a magnetic sensor having a flux gate structure. An output signal having a predetermined polarity and generated by the detection coil is received. When the excitation current is supplied, a first signal is held and output until the excitation current is stopped on the basis of the supply state of the excitation current obtained when the peak of this output signal exceeds a predetermined threshold. When the excitation current is not supplied, a second signal is held and output until the supply of the excitation current is started.

According to the present invention, for example, a positive output signal generated by a detection coil is received. When the excitation current is kept supplied, a first signal (e.g., an "L"-level signal) is held and output until the supply of the excitation current is stopped; or when the excitation current is not supplied, a second signal (e.g., an "H"-level signal) is held and output until the supply of the excitation current is started, on the basis of the supply state of the excitation current obtained when the peak of this output signal exceeds the predetermined threshold. A latch means according to the present invention is, for example, a latch circuit 7' shown in FIG. 5.

BRIEF DESCRIPTION OF THE DRAWINGS

FIG. 4 is a diagram showing the main part of the second embodiment of the present invention;

FIG. 5 is a diagram showing the main part of the third embodiment of the present invention;

DESCRIPTION OF THE PREFERRED EMBODIMENTS

The present invention will be described in detail with reference to the preferred embodiments.

Figure 1:
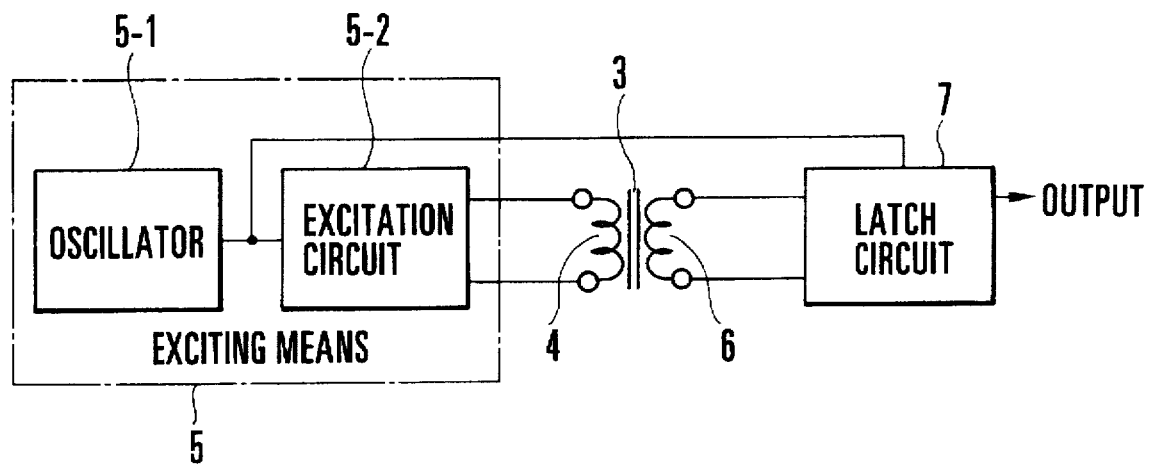
FIG. 1 is a diagram showing the main part of the first embodiment of the present invention.

FIG. 1 shows the main part of the first embodiment of the present invention. Referring to FIG. 1, reference numeral 3 denotes a magnetic core; 4, an excitation coil wound on the magnetic core 3; 5, an exciting means for repeatedly supplying a rectangular wave excitation current having a given polarity to the excitation coil 4; 6, a detection coil wound on the magnetic core 3 to generate an output signal having peaks of opposite polarities corresponding to the magnitudes of a target measurement magnetic field in response to the leading and trailing edges of the rectangular wave excitation current supplied from the exciting means 5; and 7, a latch circuit for receiving the positive output signal from the detection coil 6 and holding and outputting a signal corresponding to the supply state of the excitation current obtained when the peak of the output signal exceeds a predetermined threshold.

In this embodiment, the exciting means 5 comprises an oscillator 5-1 that provides a periodic, or oscillating, signal to an excitation circuit 5-2, such as a sine wave. The excitation circuit 5-2 receives the periodic signal from the oscillator 5-1 and converts the periodic signal into a rectangular wave excitation current. The rectangular wave excitation current has the same period as the periodic signal from the oscillator 5-1, and the phase of the rectangular wave excitation current is fixed with respect to the phase of the periodic signal from the oscillator, so that the polarity of the field of the excitation coil 4 is known. When the positive output signal from the detection coil 6 exceeds the predetermined threshold, the latch circuit 7 holds and outputs a signal corresponding to the supply state of the excitation current. In this case, as the signal corresponding to the supply state of the excitation current, the latch circuit 7 holds and outputs the level of the output signal from the oscillator 5-1. The magnetic core 3 consists of a highly heat-resistant material having a small change in magnetic characteristics with respect to temperatures. Examples of this material are Permalloy and an amorphous alloy.

Figure 2:
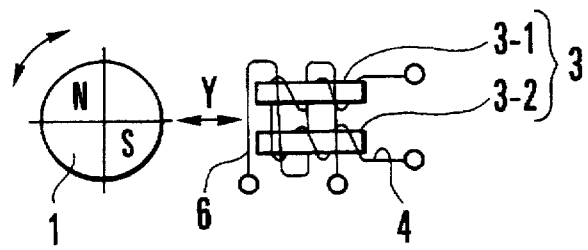
FIG. 2 is a view showing the winding state of an excitation coil and a detection coil on a magnetic core in FIG. 1.

FIG. 2 shows the winding state of the excitation coil 4 and the detection coil 6 on the magnetic core 3. In this arrangement, the magnetic core 3 is divided into magnetic core portions 3-1 and 3-2. The excitation coil is wound on the magnetic core portions 3-1 and 3-2 in opposite directions, and the detection coil 6 is wound on the magnetic core 3 on which the excitation coil 4 has been wound. Note that reference symbol Y denotes the direction of a target measurement magnetic field.

Figure 3:
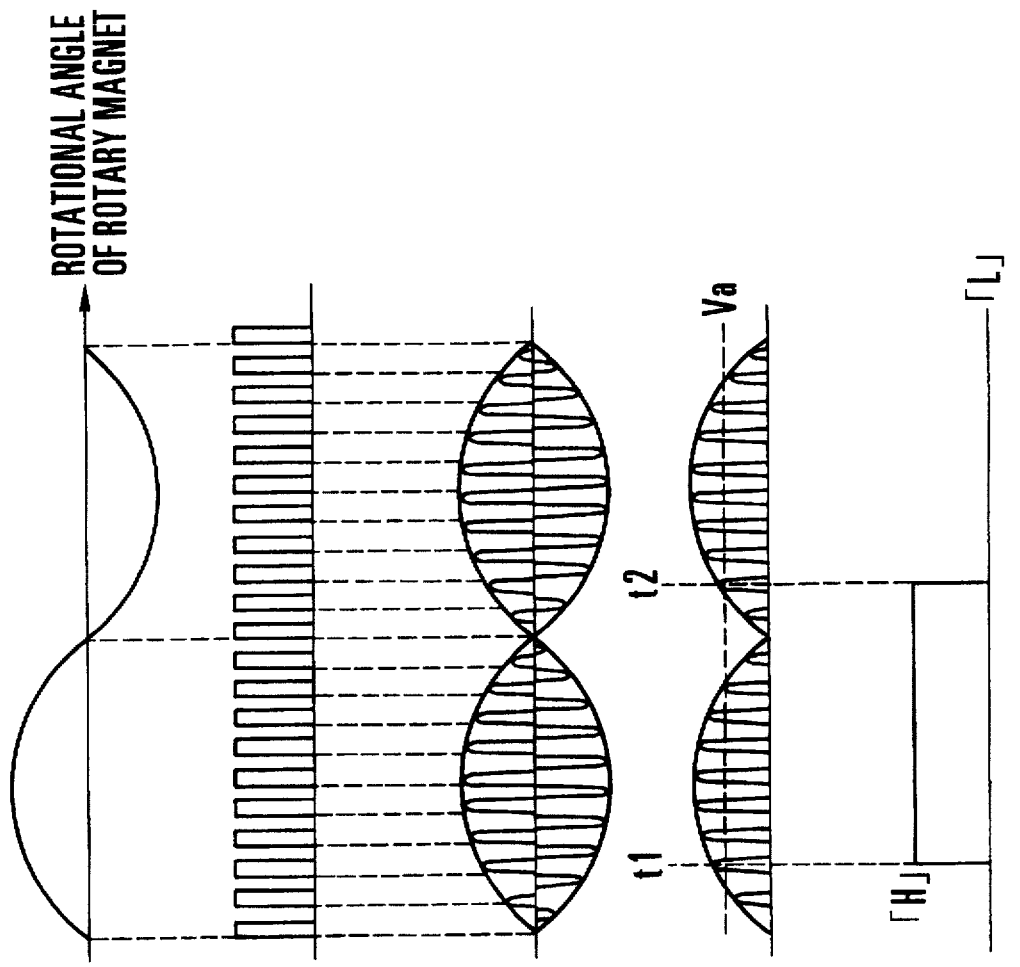
FIGS. 3A to 3E are timing charts for explaining an operation of a magnetic sensor shown in FIG. 1.

The operation of this magnetic sensor will be described with reference to the timing charts of FIGS. 3A to 3E in conjunction with FIG. 2. When a rotary magnet 1 is rotated in FIG. 2, a magnetic field in the direction Y of the target measurement magnetic field (the magnetic field in the direction Y will be simply referred to as a target measurement magnetic field) changes with an almost sine characteristic curve (FIG. 3A). The excitation coil 4 is driven with a pulsed rectangular excitation current, FIG. 3B. In this embodiment, the excitation current flows in response to a positive rectangular excitation voltage, that is, the excitation voltage varies between a positive value and ground. As the rotary magnet 1, FIG. 2, is rotated, a target measurement magnetic field, represented as the arrow Y in FIG. 2 and the wave form shown in FIG. 3A, varies with a sinuous characteristic. A detection coil 6 generates an output signal, FIG. 3C, in response to changes in current through the excitation coil 4. The output signal is in the form of positive and negative peaks induced by the rising and falling edges of the rectangular excitation current. This output signal has a magnitude almost equal to the magnitude of the target measurement magnetic field. When the polarity of the target measurement magnetic field is inverted, the polarity of the output signal is inverted accordingly. This principle is described in Japanese Patent Laid-Open No. 61-83909, and a detailed description thereof will be omitted.

The output signal from the detection coil 6 is supplied to the latch circuit 7. The latch circuit 7 receives the positive output signal from the detection coil 6. When the peak of this output signal exceeds a predetermined threshold (Va in FIG. 3D) (time t1 in FIG. 3D), the latch circuit 7 holds and outputs the level ("H" level) (time t1 in FIG. 3E) of the output signal from the oscillator 5-1 as a signal corresponding to the supply state of the excitation current. Note that the threshold Va is set as an appropriate value between the minimum and maximum values of the positive output signal from the detection coil 6.

The latch circuit 7 holds the "H"-level signal held at time t1 until time t2 and holds and outputs an "L"-level signal from time t2. More specifically, the latch circuit 7 monitors the level of the output signal from the oscillator obtained when the peak of the positive output signal from the detection coil 6 exceeds the threshold Va. At time t2 when this level changes from "H" level to "L" level, the latch circuit 7 holds and outputs the "L"-level signal instead of the "H"-level signal. Therefore, the latch circuit 7 outputs an output of one pulse per revolution of the rotary magnet 1.

Since this magnetic sensor has a flux gate structure using the magnetic core 3, the excitation coil 4, the exciting means 5, and the detection coil 6, the magnetic sensor has a sensitivity capable of detecting a change in magnetic field as small as 0.1 Gauss, which is the geomagnetic level. That is, the magnetic sensor has a high sensitivity to a magnetic field, and an inexpensive weak magnet can be used as the rotary magnet 1, thus allowing detection from a remote location. In addition, since a highly heat-resistant material (e.g., Permalloy or an amorphous alloy) having a small change in magnetic characteristics with respect to temperatures is used as a magnetic core, a change in sensitivity with respect to temperatures can be reduced, a high heat resistance can be obtained, and the sensor can be used in a place where a large temperature change occurs or in a high-temperature environment.

FIG. 4 shows the main part of another embodiment of the present invention. In this embodiment, an excitation circuit 5-2 is constituted by an inverter logic circuit INV1 and a resistor R1. The latch circuit is constituted by a D flip-flop FF1. The excitation circuit 5-2 supplies a rectangular wave excitation current to an excitation coil 4 in a known phase relationship with, and having the same period as, a periodic output signal from an oscillator 5-1. The D flip-flop FF1 receives a positive output signal from a detection coil 6 at a clock terminal CK. Every time the peak of this output signal exceeds a threshold Va, the D flip-flop FF1 holds and outputs (Q output) the level (D input) of the oscillated signal from the oscillator 5-1. As in the first embodiment, the D flip-flop FF1 generates an output of one pulse per revolution of a rotary magnet 1.

FIG. 5 shows the main part of still another embodiment of the present invention. In this embodiment, an excitation circuit 5-2 is constituted by an inverter logic circuit INV1 and a resistor R1. The latch circuit comprises a latch circuit 7' constituted by an RS flip-flop FF2 and AND gates AND1 and AND2. In the latch circuit 7', an output from the AND gate AND1 is input to the R input of the RS flip-flop FF2, and an output from the AND gate AND2 is input to the S input of the RS flip-flop FF2. A positive output signal generated by a detection coil 6 is input to one terminal of each of the AND gates AND1 and AND2. The output of the oscillator 5-1 is provided to the other terminals on each of the AND gates AND1 and AND2. The other terminal on AND1 is a non-inverting input, while the other terminal on AND2 is an inverting input.

The excitation circuit 5-2 supplies a rectangular wave excitation current having a given polarity to an excitation coil 4 in a known phase relationship with, and of the same period as, the periodic output signal from the oscillator 5-1. The positive output signal from the detection coil 6 is supplied to one terminal of each of the AND gates AND1 and AND2. When the peak of the positive output signal generated by the detection coil 6 exceeds a threshold Va, the AND gate AND1 is enabled for the output signal from the oscillator 5-1. When the peak of the positive output signal generated by the detection coil 6 exceeds the threshold Va, the AND gate AND2 is enabled for the inverted signal of the output signal from the oscillator 5-1.

Assume that the peak of the positive output signal generated by the detection coil 6 exceeds the threshold Va at time t1 in FIG. 3D. In this case, the AND gate AND1 gates the output signal ("H" level) from the oscillator 5-1 and sends it to the R input of the RS flip-flop FF2. The RS flip-flop FF2 is reset, and its Q output is set at "L" level. Once the RS flip-flop FF2 is reset, it holds the reset state until an "H"-level signal is input to its S input.

Assume that the peak of the positive output signal generated by the detection coil 6 exceeds the threshold Va at time t2 in FIG. 3D. In this case, the AND gate AND2 gates the inverted signal ("H" level) of the output signal from the oscillator 5-1 and sends it to the S input of the RS flip-flop FF2. The RS flip-flop "FF" is set, and its Q output is set at "H" level. Once the RS flip-flop FF2 is set, it holds the set state until an "H"-level signal is input to its R input.

As in the first embodiment, the RS flip-flop FF2 generates an output of one pulse per revolution of a rotary magnet 1.

Figure 6:
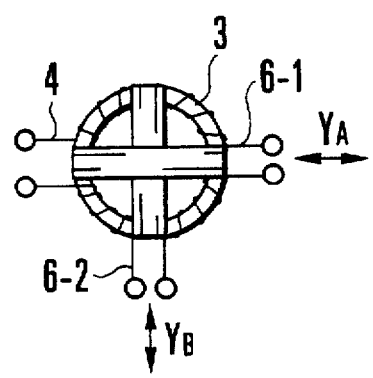
FIG. 6 is a view showing another winding state (biaxial detection arrangement using an annular magnetic core) of an excitation coil and a detection coil on a magnetic core.
Figure 7:
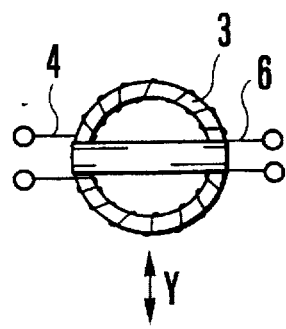
FIG. 7 is a view showing still another winding state (uniaxial detection arrangement using an annular magnetic core) of an excitation coil and a detection coil on a magnetic core.
Figure 8:
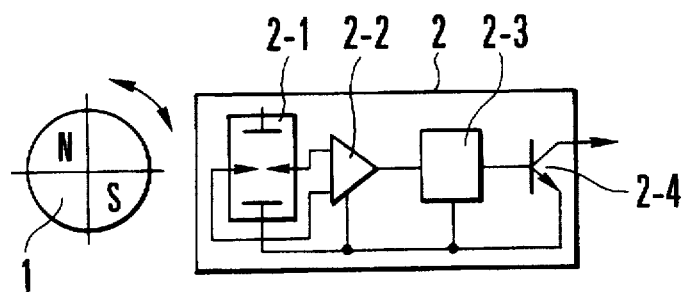
FIG. 8 is a view showing the arrangement of the main part of a conventional magnetic sensor.

In each embodiment described above, the winding state of the excitation coil 4 and the detection coil 6 on the magnetic core 3 has a uniaxial detection arrangement, as shown in FIG. 2. However, a biaxial detection arrangement shown in FIG. 6 may be employed. As shown in FIG. 6, the magnetic core 3 comprises an annular magnetic core. The excitation coil 4 is wound on the ring portion of this annular magnetic core 3. A-and B-phase detection coils 6-1 and 6-2 cross each other on the annular magnetic core 3 on which the excitation coil 4 has been wound. Reference symbols $Y_A$ and $Y_B$ in FIG. 6 denote the directions of a target measurement magnetic field. As shown in FIG. 7, a uniaxial detection arrangement in which the detection coil 6 is wound on the annular magnetic core 3 on which the excitation coil 4 has been wound may be employed.

In each embodiment described above, an output of one pulse per revolution of the rotary magnet 1 is obtained. However, the number of output pulses per revolution of the rotary magnet 1 may be arbitrarily changed in accordance with the number of poles of the rotary magnet 1. In each embodiment described above, an arrangement for detecting a rotational motion is exemplified. However, an arrangement for detecting a linear motion may be employed. In each embodiment described above, the positive output signal generated by the detection coil 6 is received, but a negative output signal generated by the detection coil 6 may be received. In that case, the threshold Va would be a negative value. In each embodiment described above, the positive rectangular wave excitation current is supplied to the excitation coil 4, but a negative rectangular wave excitation current may be supplied to it.

As has been described above, according to the present invention, a magnetic core, an excitation coil, an exciting means, and a detection coil are arranged to obtain a magnetic sensor having a flux gate structure. An output signal having a predetermined polarity generated by a detection coil is received, and the supply state of an excitation current obtained when the peak of this output signal exceeds a predetermined threshold is monitored. A signal corresponding to the supply state of the excitation current is held and output. A sensitivity to a magnetic field can be set higher than that of a conventional arrangement using a Hall element or the like. An inexpensive weak magnet can be used as a magnet used to detect the rotational or linear motion, and detection from a remote location can be performed.

According to the present invention, since a highly heat-resistant material (e.g., Permalloy or an amorphous alloy) having a small change in magnetic characteristics with respect to temperatures is used as a magnetic core, a change in sensitivity with respect to temperatures can be reduced, and a high heat resistance can be obtained.

What is claimed is:

1. A magnetic sensor comprising:

a magnetic core;

an excitation coil wound on said magnetic core;

exciting means for repeatedly supplying a rectangular wave excitation current to said excitation coil;

a detection coil wound on said magnetic core on which said excitation coil has been wound, said detection coil being adapted to generate an output signal in response to leading and trailing edges of the rectangular wave excitation current, the output signal having peaks of a first output polarity and a second output polarity, the second output polarity being opposite from the first output polarity, wherein the first and second output polarities correspond to magnitudes of a target measurement magnetic field; and latch means for receiving an output signal peak from the detection coil, the output signal peak having a predetermined polarity, and for receiving a supply state of the excitation current, the latch means holding and outputting a latch output signal corresponding to the supply state of the excitation current when the output signal peak exceeds a predetermined threshold.

2. A magnetic sensor comprising:

a magnetic core;

an excitation coil wound on said magnetic core;

exciting means for repeatedly supplying a rectangular wave excitation current having a given polarity to said excitation coil;

a detection coil wound on said magnetic core on which said excitation coil has been wound, said detection coil being adapted to generate an output signal in response to leading and trailing edges of the rectangular wave excitation current, the output signal having peaks of a first output polarity and a second output polarity, the second output polarity being opposite from the first output polarity, wherein the first and second output polarities correspond to magnitudes of a target measurement magnetic field; and latch means for receiving an output signal peak from the detection coil, the output signal peak having a predetermined polarity, and for receiving a supply state of the excitation current the latch means holding and outputting a latch signal corresponding to a supply state of the excitation current every time the output signal peak exceeds a predetermined threshold.

3. A magnetic sensor comprising:

a magnetic core;

an excitation coil wound on said magnetic core;

exciting means for repeatedly supplying a rectangular wave excitation current having a given polarity to said excitation coil;

a detection coil wound on said magnetic core on which said excitation coil has been wound, said detection coil being adapted to generate an output signal in response to leading and trailing edges of the rectangular wave excitation current, the output signal having peaks of a first output polarity and a second output polarity, the second output polarity being opposite from the first output polarity, wherein the first and second output polarities correspond to magnitudes of a target measurement magnetic field; and latch means for receiving an output signal peak from the detection coil, the output signal peak having a predetermined polarity, and for receiving a supply state of the excitation current the latch means holding and outputting a first latch output signal during a first excitation current supply state until the excitation current is stopped and a second latch output signal during a second excitation current supply state until the excitation current is started, when the output signal peak exceeds a predetermined threshold.

4. The magnetic sensor of claim 1 wherein the magnetic core, the excitation coil, and the detection coil form a flux gate structure.

5. The magnetic sensor of claim 2 wherein the magnetic core, the excitation coil, and the detection coil form a flux gate structure.

6. The magnetic sensor of claim 3 wherein the magnetic core, the excitation coil, and the detection coil form a flux gate structure.

7. The magnetic sensor of claim 1 wherein the magnetic core comprises Permalloy or an amorphous alloy.

8. The magnetic sensor of claim 2 wherein the magnetic core comprises Permalloy or an amorphous alloy.

9. The magnetic sensor of claim 3 wherein the magnetic core comprises Permalloy or an amorphous alloy.

10. The magnetic sensor of claim 1 further comprising a second detection coil wound on said magnetic core.

11. The magnetic sensor of claim 2 further comprising a second detection coil wound on said magnetic core.

12. The magnetic sensor of claim 3 further comprising a second detection coil wound on said magnetic core.

13. The magnetic sensor of claim 1 wherein the rectangular wave excitation current has an excitation frequency at least ten times greater than a measurement frequency of the target measurement magnetic field.

14. The magnetic sensor of claim 2 wherein the rectangular wave excitation current has an excitation frequency at least ten times greater than a measurement frequency of the target measurement magnetic field.

15. The magnetic sensor of claim 3 wherein the rectangular wave excitation current has an excitation frequency at least ten times greater than a measurement frequency of the target measurement magnetic field.

* * * * *